United States Patent
Bryde et al.

(10) Patent No.: US 7,004,471 B2
(45) Date of Patent: Feb. 28, 2006

(54) RADIAL LIP SEAL

(75) Inventors: Steven G. Bryde, Davisburg, MI (US); Terrence Christensen, Grand Blanc, MI (US); Marcos Basile Teixeira, Sao Paulo (BR); Marcio Caldas Camargo Lima, Sao Paulo (BR); Antonio Rangel Machado, Sao Paulo (BR); Marcos Castanho Santanna, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/738,880

(22) Filed: Dec. 17, 2003

(65) Prior Publication Data

US 2005/0134003 A1 Jun. 23, 2005

(51) Int. Cl.
*F16J 15/32* (2006.01)
(52) U.S. Cl. .................. 277/318; 277/321; 277/551; 277/559
(58) Field of Classification Search ............... 277/318, 277/319, 321, 551, 559, 320
See application file for complete search history.

(56) References Cited

U.S. PATENT DOCUMENTS

| | | | | | |
|---|---|---|---|---|---|
| 4,114,898 | A | * | 9/1978 | Bainard et al. | 277/551 |
| 4,126,317 | A | * | 11/1978 | Bainard | 277/551 |
| 5,209,499 | A | * | 5/1993 | Ruff et al. | 277/551 |
| 5,553,866 | A | * | 9/1996 | Heinzen | 277/551 |
| 5,895,052 | A | * | 4/1999 | Drucktenhengst et al. | 277/351 |
| 6,634,648 | B1 | * | 10/2003 | Rockwell | 277/572 |
| 6,779,798 | B1 | * | 8/2004 | Fougerolle | 277/320 |

FOREIGN PATENT DOCUMENTS

EP 1116905 * 7/2001

* cited by examiner

*Primary Examiner*—Alison K. Pickard
(74) *Attorney, Agent, or Firm*—Christopher DeVries

(57) ABSTRACT

A radial lip seal including an annular support with a radially extending portion having an inner periphery. An annular seal lip formed of elastomeric material such as polytetrafluoroethylene is connected to the inner periphery. The lip has an inner side adapted to seal a circumferential surface of a shaft and an outer side. The outer side of the lip has a plurality of grooves or protrusions to vary the diameter of the lip. The varied diameter creates a substantial leak between the outer side of the lip and the circumferential surface. The leak created is sufficient to be detected by a low-pressure air test.

6 Claims, 6 Drawing Sheets

RADIAL LIP SEAL

TECHNICAL FIELD

This invention relates to a radial lip seal for sealing a relatively rotatable cylindrical member. The invention has particular utility in the automotive industry for engine crankshaft seals.

BACKGROUND OF THE INVENTION

Radial lip seals or radial contact seals are used to seal a shaft's circumferential surface by engagement of a lip with the surface to be sealed. In some cases, helical grooves in the engaging surface of the seal are provided to respond to shaft rotation by pumping the oil or other fluid back toward the oil sump to minimize leakage.

In order to provide an adequate seal, the radial lip seal must be installed so that the lip is angled axially inward toward the sump and stretched over the shaft with the helical grooves engaging the circumferential surface. However, during installation it is possible for the radial lip to be folded (flipped) over to at least a partially extend outward away from the oil sump with the back of the lip engaging the shaft. In this condition, the smooth back of the lip may provide a minimal leak path so that a low pressure air test may not detect the flipped seal.

A method of increasing the leak path of a flipped seal is desired so that a flipped seal can be detected with a low pressure air test.

SUMMARY OF THE INVENTION

A principal object of the present invention is to provide a radial lip seal which, when improperly installed on a circumferential surface of a shaft, creates a substantial leak condition capable of being detected by a low pressure air test.

In an exemplary embodiment, the radial lip seal includes an annular support with a radially extending portion having an inner periphery. An annular seal lip formed of elastomeric material such as polytetrafluoroethylene is connected to the inner periphery. While the seal is in a free state, the lip extends both axially and radially inward. The lip has an inner side engageable with the shaft to seal a circumferential surface of the shaft. The inner side of the lip may have hydrodynamic aids, such as grooves, flutes, ribs, or threads, which create a small hydrodynamic pump to carry fluid away from the lip. An outer side of the lip is smooth and does not provide a sealing function when the seal is properly installed.

A pair of dust seals extend from the annular support. A first dust seal is spaced axially from the seal lip and positioned to closely oppose the circumferential surface of the shaft. A second dust seal spaced radially from the first dust seal is positioned to closely oppose a radial surface of an associated flywheel. The dust seals limit the entry of particles into the oil seal lip, thereby extending the operating life of the oil seal.

The present invention provides a plurality of radial/axial grooves or protrusions on the outer side of the lip to vary the diameter of the lip. The varied diameter creates a substantial leak between the outer side of the lip and the circumferential surface. The leak created is sufficient to be detected by a low-pressure air test.

These and other features and advantages of the invention will be more fully understood from the following description of certain specific embodiments of the invention taken together with the accompanying drawings.

DESCRIPTION OF THE PREFERRED EMBODIMENT

Figure 1:
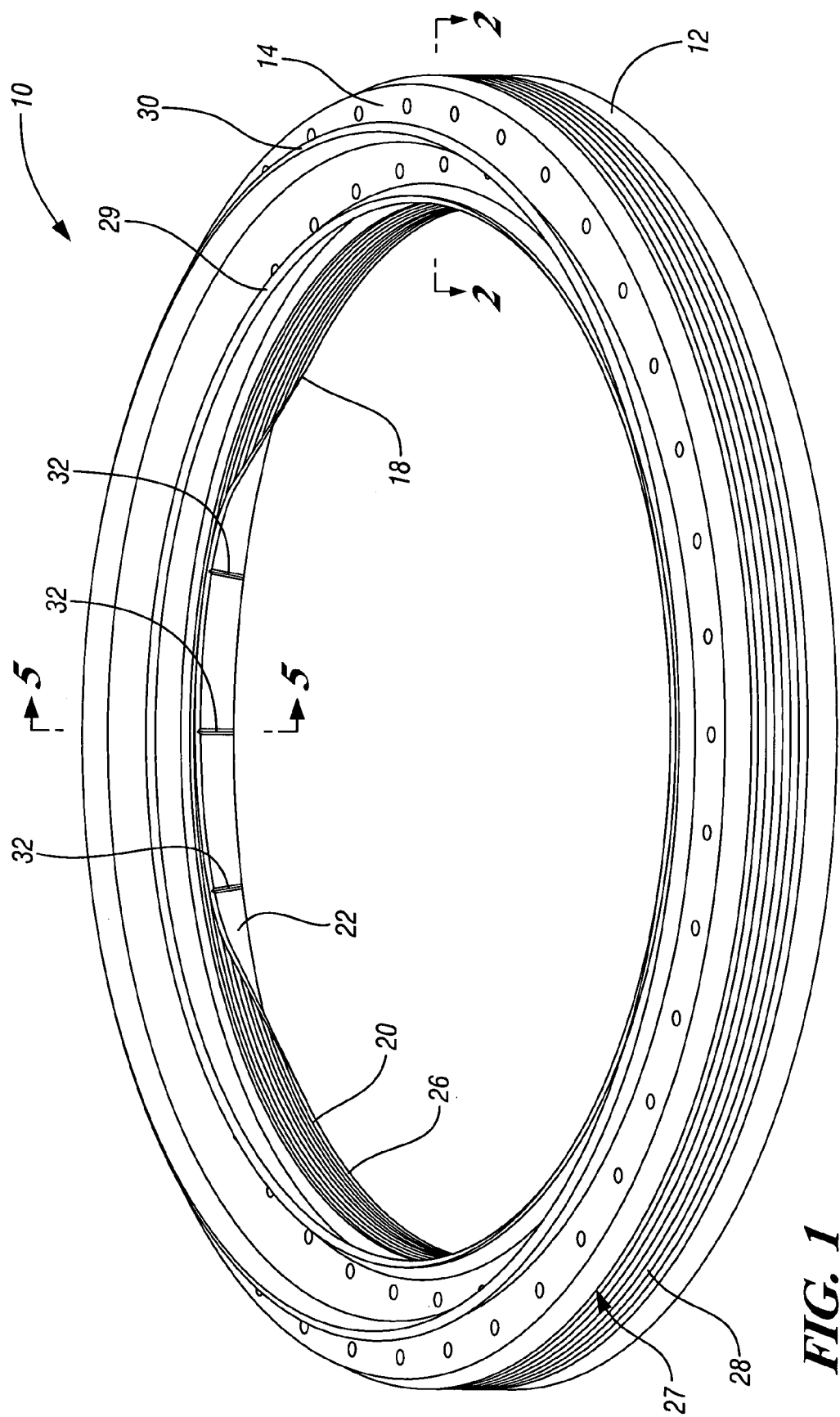
FIG. 1 is a pictorial view of a radial lip seal formed in accordance with the present invention.
Figure 2:
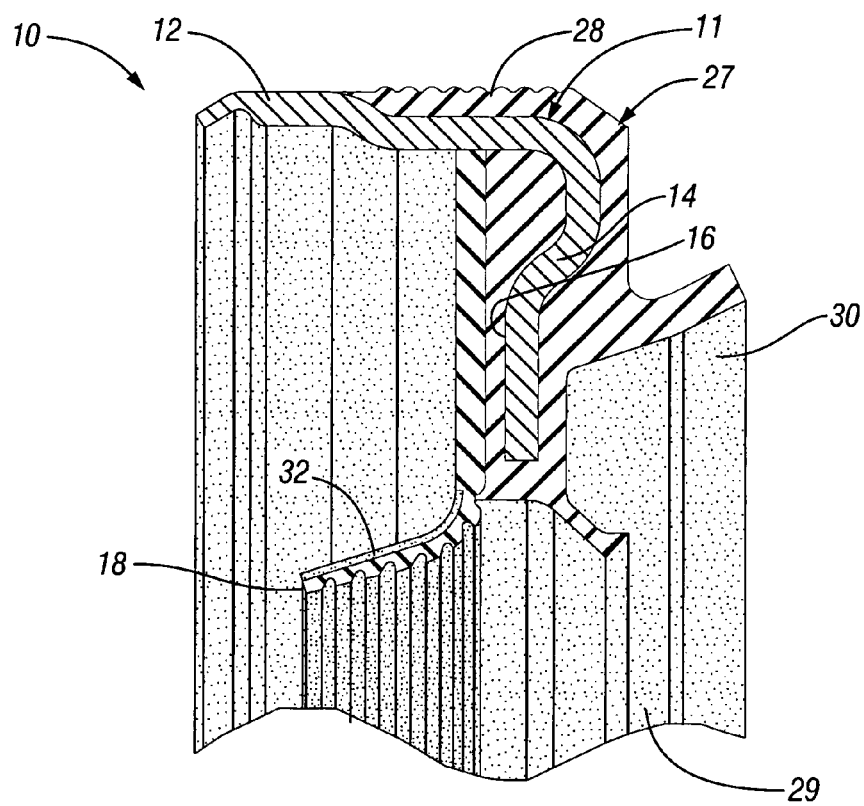
FIG. 2 is a part-sectional view taken through line 2—2 in FIG. 1, showing the lip in a free state position.
Figure 3:
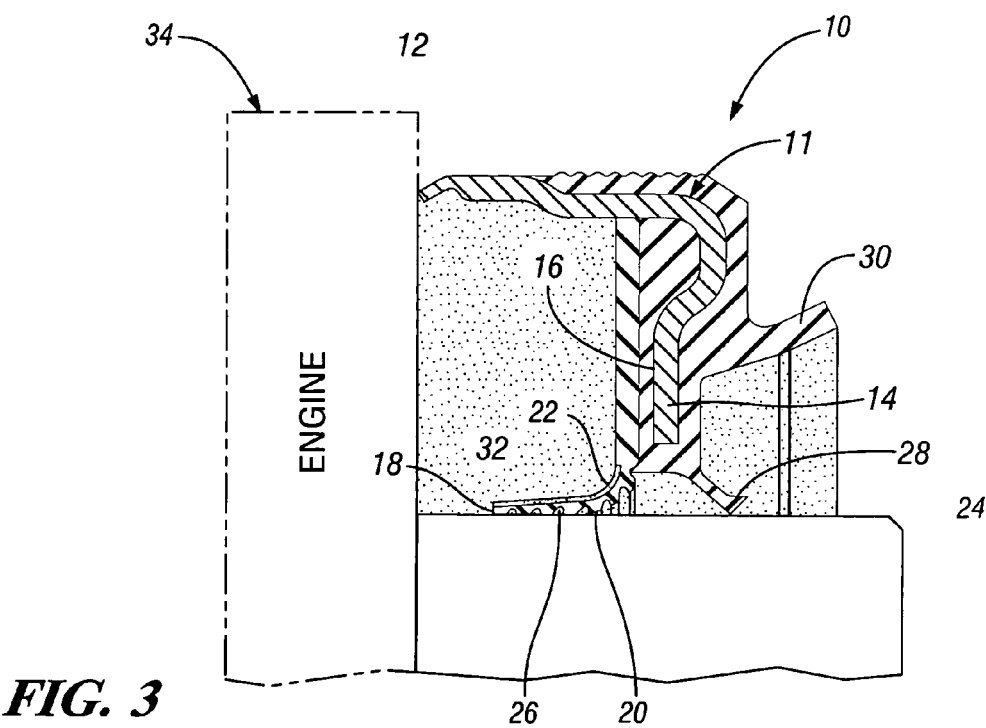
FIG. 3 is a cross-sectional view showing the seal of FIG. 1 properly installed on a crankshaft of an engine.

Referring now to FIGS. 1 and 2 of the drawings in detail, numeral 10 generally indicates a radial lip seal for use in automotive engine applications. The seal 10 includes a steel support ring 11 having a generally cylindrical outer portion 12, connecting at one edge with a radial portion 14 extending inwardly to an inner periphery 16. An annular seal lip 18 formed of elastomeric material such as polytetrafluoroethylene is connected to the inner periphery 16 and extends both axially and radially inward while the seal is in a free state, as shown in FIG. 2. The lip 18 has an inner side 20 and an outer side 22. The inner side 20 is designed to seal a circumferential surface of a shaft 24, as shown in FIG. 3 and may have hydrodynamic aids 26 such as grooves, flutes, ribs, or threads. These operate to create a fluid pressure differential for pumping fluid away from the end of the lip 18.

The radial lip seal 10 preferably has a rubber body 27 overmolded on portions of the annular support 12. The rubber supports a ribbed static seal 28 and a pair of dust seals 29, 30. The first dust seal 29 is spaced axially from the seal lip 18 and positioned to closely oppose the circumferential surface of the shaft 24. The second dust seal 30 is spaced radially from the first dust seal 28 and is positioned to closely oppose an associated flywheel, not shown.

Figure 4:
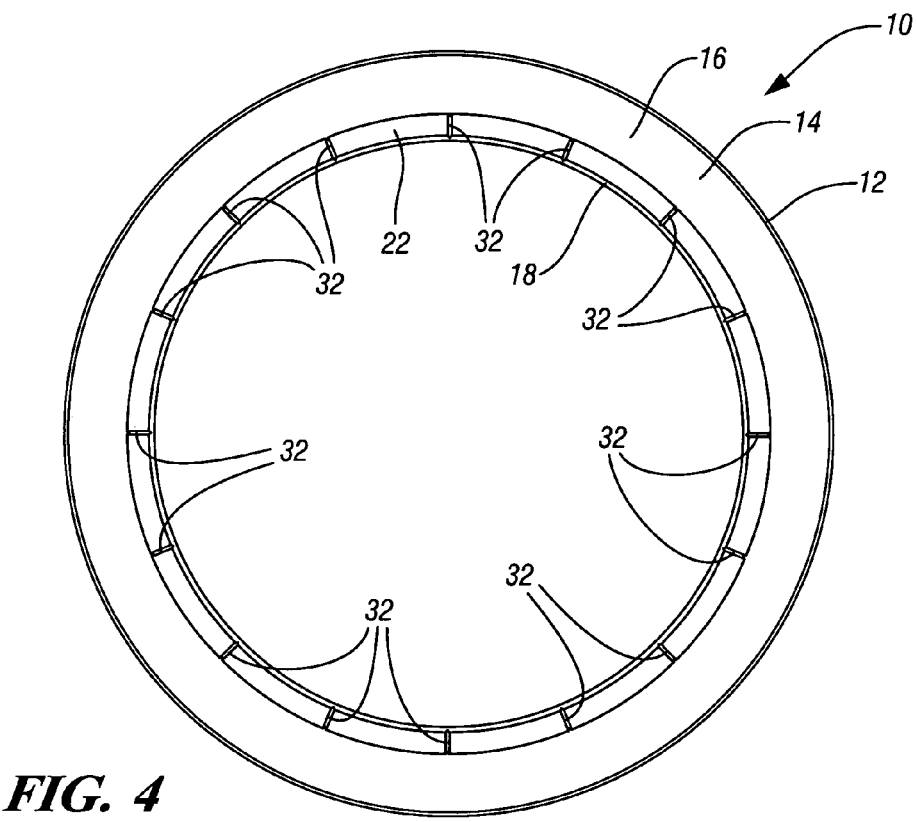
FIG. 4 is an inner end view of the radial lip seal of FIG. 1.
Figure 5:
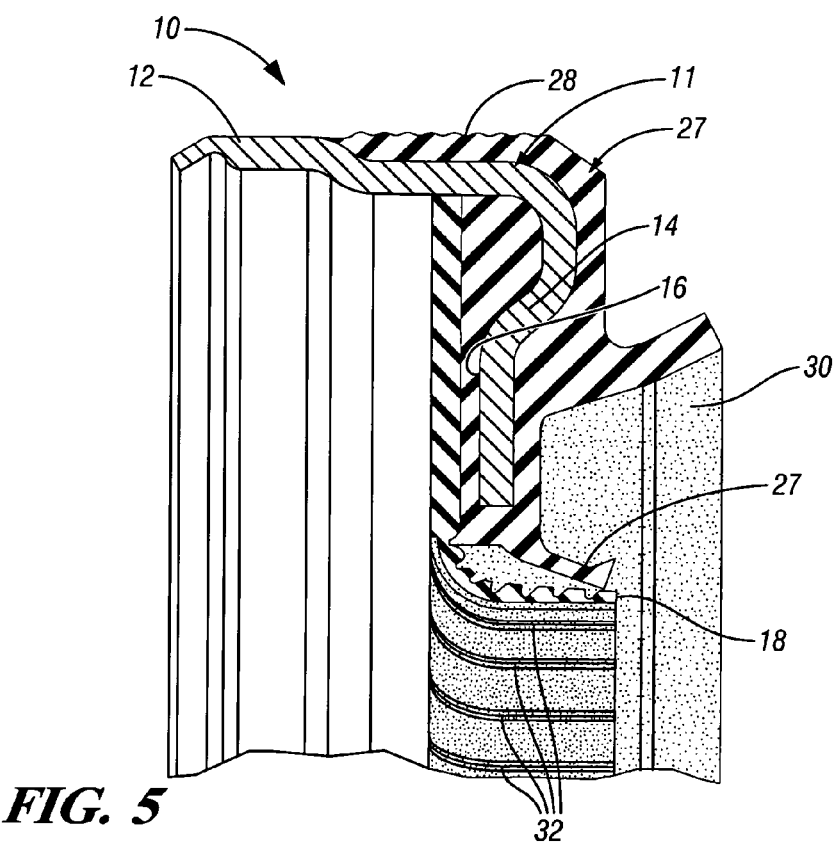
FIG. 5 is a part-sectional view taken through line 5—5 in FIG. 1, showing the lip in a flipped position.

The preferred embodiment of the present invention includes a plurality of radial and axial grooves 32 located on the outer side 22 of the lip 18, as illustrated in FIG. 4, to vary the diameter of the lip. The grooves 32 may be molded with the lip 18 or coined into lip at a later time. The variable diameter created by the grooves 32 in the outer side 22 of the lip 18, form passages that creates a substantial leak between the outer side of the lip and the circumferential surface of the shaft 24 when the lip is installed improperly, as shown in FIGS. 5 and 6.

Figure 7:
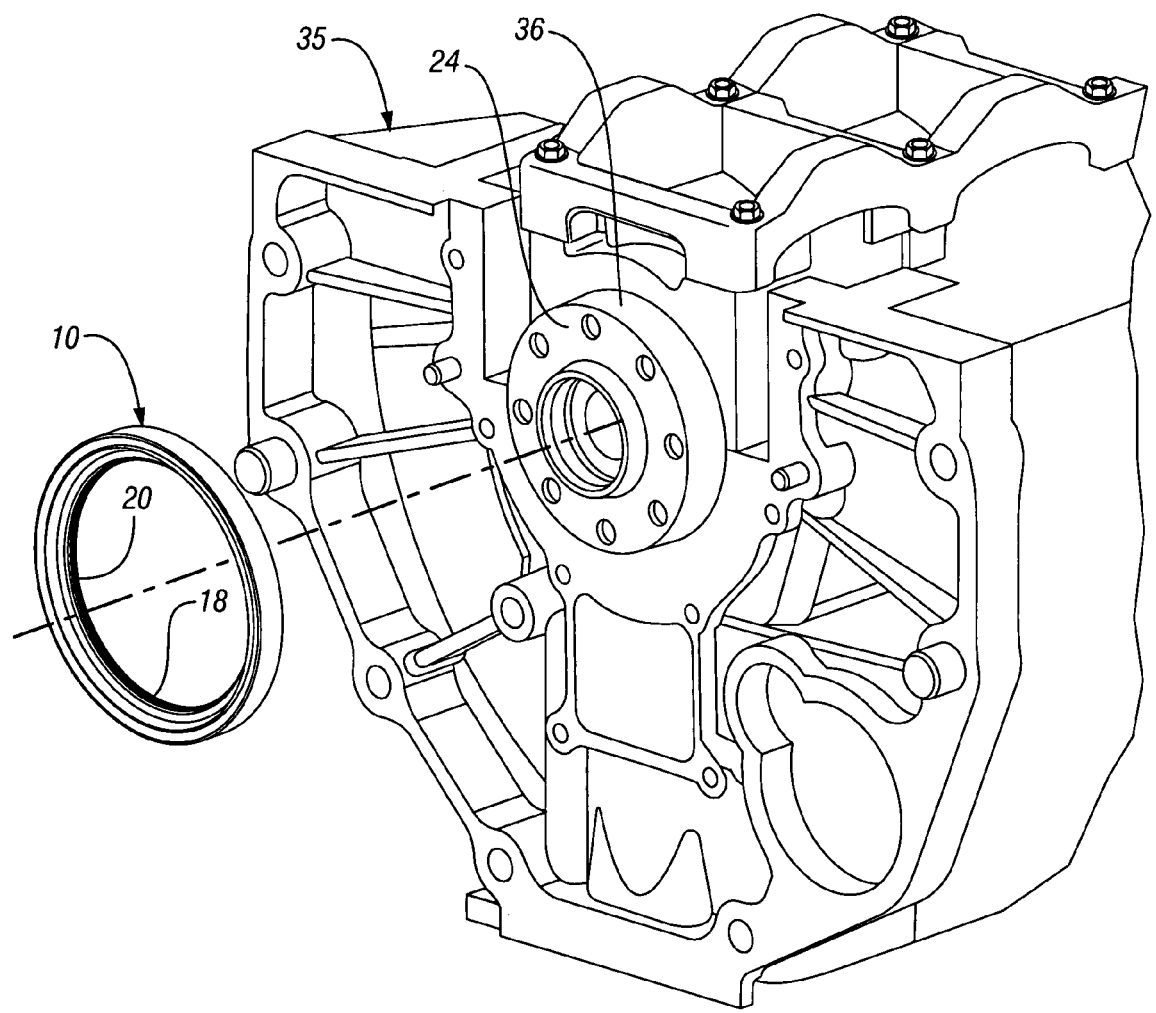
FIG. 7 is an exploded pictorial view showing the seal of FIG. 1 in position to be installed on the crankshaft flange of an engine.

FIG. 7 illustrates the seal 10 being installed on a crankshaft 24 of an engine 34. During installation, seal is fitted into a housing, not shown, and the inner side 20 of lip 18 is stretched over a conical expander, not shown. The stretched seal is then pushed over a smooth outer surface 36 of a flange of the crankshaft 24 and the conical expander is then removed. The seal lip 18 then sealingly engages the flange outer surface 36 and is supported within the housing, not shown.

As the radial lip seal is pressed onto the shaft 24, the lip 18 stretches around the shaft to provide a hydrodynamic seal, as shown in FIG. 3. When the seal is properly installed, the inner side 20 of the lip 18 contacts the circumferential surface of the shaft 24 while the lip extends axially inward toward engine 34. During a low pressure leak test with a properly installed seal, air pressure will impose a radially directed force on the lip 18, causing the lip to expand against the surface of the shaft 24 and thereby maintain the seal. As a result, the amount of leaked air will be minimal and the test will determine the seal is proper.

Figure 6:
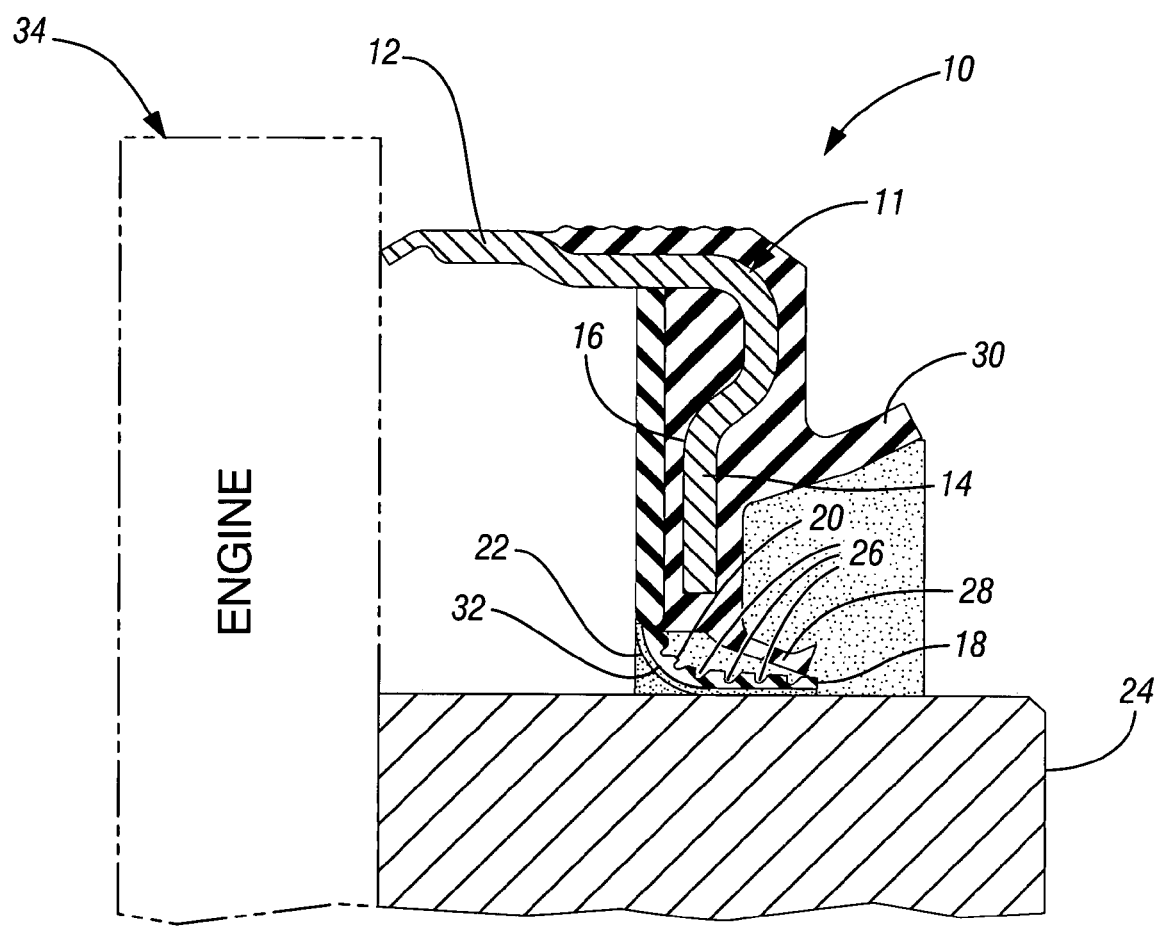
FIG. 6 is a cross-sectional view showing the seal of FIG. 1 improperly installed on a crankshaft of an engine.

FIG. 6 of the drawings illustrates an improperly installed seal 10. When the seal is improperly installed, the lip 18 extends axially outward away from engine 34 so that the outer side of the lip contacts the shaft 24. During a low pressure leak test of an improperly installed seal, the grooves 32 between the outer side 22 of the lip 18 and the shaft 24 will leak a small amount of low pressure air to indicate an improperly installed seal. If the amount of air pressure is great enough during the test, the air pressure will impose a radially directed force on the lip, causing the lip 18 to expand outward away from the surface of the shaft 24 and further increase the leak path.

The additional leak paths through the grooves 32 along the surface of the shaft 24, when the seal is improperly installed, improve the accuracy of low pressure air testing by increasing the amount of air leaked between the seal and the outer surface of the shaft. Specifically, during a low pressure air test, the amount of air leaked in a flipped conventional seal may be minimal, while, the amount of air leaked in a flipped improved seal 10 is many times greater than the conventional seal. The additional leakage through the improved seal 10 allows a flipped seal to be detected with the conventional low pressure air test. When a flipped seal is detected, the seal can be removed from the shaft and reinstalled properly.

Figure 8:
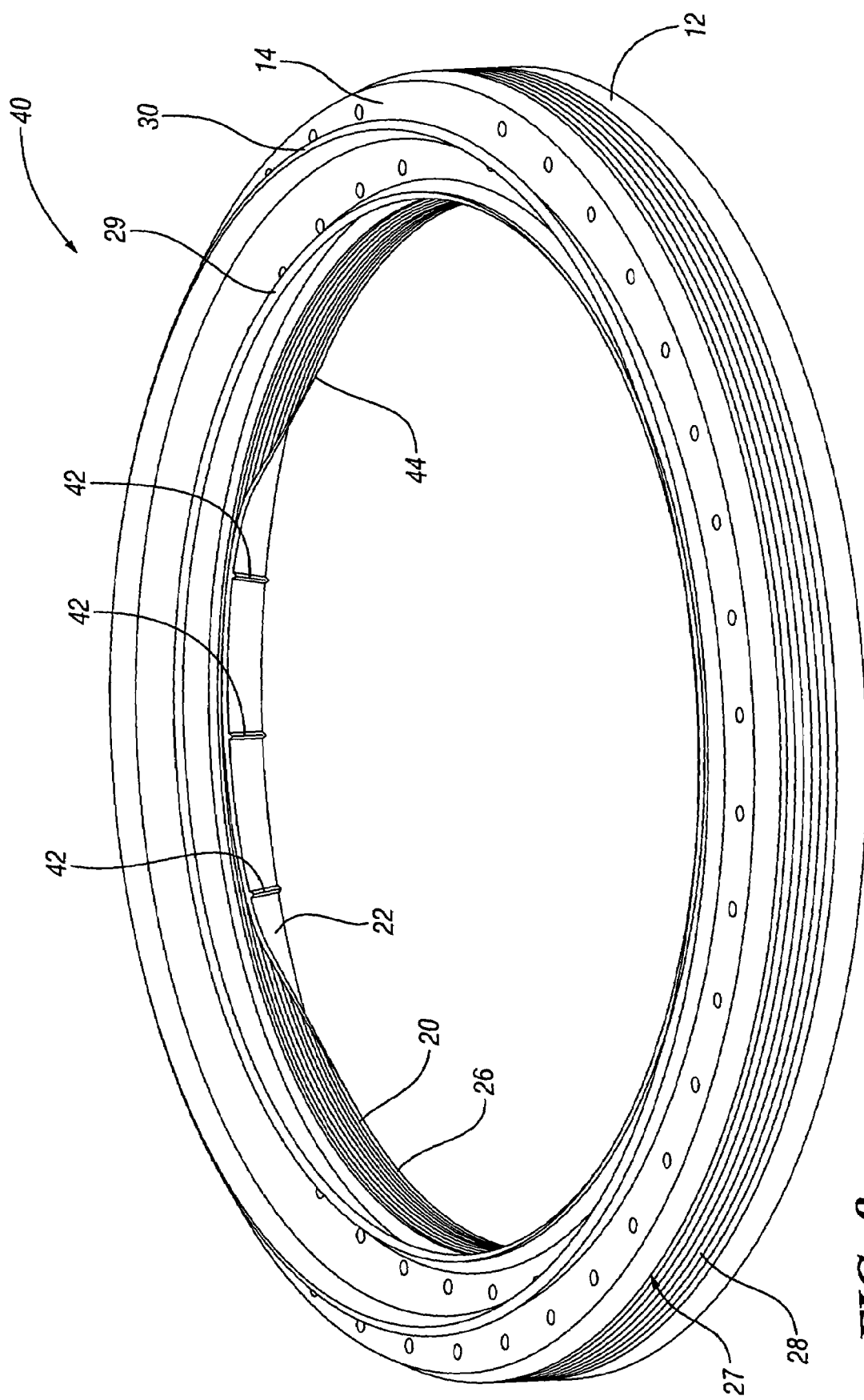
FIG. 8 is a pictorial view of an alternative embodiment of a radial lip seal according to the invention.

Referring now to FIG. 8 of the drawings, numeral 40 generally indicates an alternative embodiment of a radial lip seal. Seal 40 is generally similar to seal 10 except that the grooves 32 are replaced by a plurality of ridges 42 extending linearly along around the radius of the outer side of the lip 44.

Radial lip seal 40 functions similarly to radial lip seal 10, when the seals are properly installed on shaft 24. However, when radial lip seal 40 is improperly installed on shaft 24, the ridges 42 create gaps between the surface of shaft 24 and the outer side 22 of the lip 44. The gaps created between the lip 44 and the shaft 24 leak air during a low pressure test similar to the grooves of lip seal 10. Thus a low pressure air test is effective to detect an improper seal installation.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A radial lip seal comprising:
    an annular support including a radially extending portion having an inner periphery; and
    an annular seal lip connected to the inner periphery and extending both axially and radially inward in the free state, the lip having an inner side and an outer side adapted when installed to sealingly engage a circumferential surface of a shaft;
    the outer side having an outer surface that is essentially smooth except for relatively narrow circumferentially spaced radial protrusions extending outward from the smooth surface such that engagement of the outer surface with the shaft creates a substantial leak condition capable of being detected by a low pressure air test.

2. A radial lip seal as in claim 1 including;
    a first dust seal spaced axially from the seal lip and adapted to closely oppose the shaft circumferential surface; and
    a second dust seal spaced radially outward of the first dust seal and extending axially for closely opposing an associated rotatable member.

3. A radial lip seal as in claim 1 wherein the annular seal lip is formed of an elastomeric material.

4. A radial lip seal as in claim 3 wherein the elastomeric material is a polymer.

5. A radial lip seal as in claim 4 wherein the polymer is polytetrafluoroethylene.

6. A radial lip seal as in claim 1 including a hydrodynamic oil control aid on the inner side of the lip operative to pump oil away from the seal.

\* \* \* \* \*